US011462768B2

(12) United States Patent
Armand et al.

(10) Patent No.: US 11,462,768 B2
(45) Date of Patent: Oct. 4, 2022

(54) HIGH-VOLTAGE STABLE COPOLYMER FOR CONSTITUTING A POLYMER ELECTROLYTE FOR A LITHIUM OR SODIUM CELL

(71) Applicant: Robert Bosch GmbH, Stuttgart (DE)

(72) Inventors: Michel Armand, Paris (FR); Hany Basam Eitouni, Oakland, CA (US); Heng Zhang, Vitoria-Gasteiz Araba (ES); Jose Castellanos, Bilbao (ES); Lide Rodriguez, Sopelana Bizkaia (ES); Mario Joost, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 16/720,519

(22) Filed: Dec. 19, 2019

(65) Prior Publication Data
US 2020/0203763 A1 Jun. 25, 2020

(30) Foreign Application Priority Data

Dec. 20, 2018 (DE) .......................... 102018222593.1

(51) Int. Cl.
| | |
|---|---|
| C08F 220/44 | (2006.01) |
| H01M 10/0565 | (2010.01) |
| C08G 81/02 | (2006.01) |
| H01M 10/0525 | (2010.01) |
| H01M 4/62 | (2006.01) |
| H01M 10/054 | (2010.01) |
| C08F 293/00 | (2006.01) |
| C08G 63/08 | (2006.01) |
| H01M 4/02 | (2006.01) |

(52) U.S. Cl.
CPC ..... *H01M 10/0565* (2013.01); *C08F 293/005* (2013.01); *C08G 63/08* (2013.01); *C08G 81/027* (2013.01); *H01M 4/622* (2013.01); *H01M 10/054* (2013.01); *H01M 10/0525* (2013.01); *C08F 2438/01* (2013.01); *H01M 2004/028* (2013.01); *H01M 2300/0082* (2013.01); *H01M 2300/0091* (2013.01)

(58) Field of Classification Search
CPC .. C08F 220/282; C08F 220/28; C08F 220/36; C08F 220/283; C08F 220/365; C08F 220/38; C08F 220/44; C08G 63/08
See application file for complete search history.

(56) References Cited

U.S. PATENT DOCUMENTS

| | | | | |
|---|---|---|---|---|
| 3,760,034 A | * | 9/1973 | Critchfield ............ | C08F 283/02 525/185 |
| 4,048,260 A | * | 9/1977 | Haaf ...................... | C08F 14/06 525/308 |
| 4,118,375 A | * | 10/1978 | Lindner ................ | C08F 220/44 526/287 |
| 4,786,749 A | * | 11/1988 | Koleske ................ | C08F 20/28 526/318 |

FOREIGN PATENT DOCUMENTS

| | | | |
|---|---|---|---|
| CN | 1363637 | * | 8/2002 |
| EP | 1215244 A2 | | 6/2002 |
| JP | H08134138 A | | 5/1996 |

OTHER PUBLICATIONS

Patil, Journal of Macromolecular Science, Part A: Pure and Applied Chemistry (2015) 52, 114-123 (Year: 2015).*
Translation of Ding, CN 1363637 (Year: 2002).*
Park et al., "A Highly Reversible Lithium Metal Anode", Scientific Reports 4 (3815), 2014, pp. 1-8.
Wetjen et al., "Thermal and electrochemical properties of PEO-LiTFSI-Pyr14 TFSI-based composite cathodes, incorporating 4 V-class cathode active materials", Journal of Power Sources 246, 2014, pp. 846-857.
Wang et al., "Effect of polyacrylonitrile on triethylene glycol diacetate-2-propenoic acid butyl ester gel polymer electrolytes with interpenetrating crosslinked network for flexible lithium ion batteries", Journal of Power Sources 295, 2015, pp. 139-148.
Mindemark et al., "High-performance solid polymer electrolytes for lithium batteries operational at ambient temperature", Journal of Power Sources 298, 2015, pp. 166-170.
Lassagne et al., "New approach to design solid block copolymer electrolytes for 40 C lithium metal battery operation", Electrochimica ACTA 238, 2017, pp. 21-29.
Wang et al., "A New All-Solid-State Hyperbranched Star Polymer Electrolyte for Lithium Ion Batteries: Synthesis and Electrochemical Properties", Electrochimica ACTA 212, 2016, pp. 372-379.
Lasinska et al., "Study of ageing effects in polymer-in-salt electrolytes based on poly (acrylonitrile-co-butyl acrylate) and lithium salts", Electrochimica ACTA 169, 2015, pp. 61-72.
Kaynak et al., "Enhanced ionic conductivity in borate ester plasticized Polyacrylonitrile electrolytes for lithium battery application", Electrochimica ACTA 164, 2015, pp. 108-113.

(Continued)

*Primary Examiner* — Robert C Boyle
(74) *Attorney, Agent, or Firm* — Norton Rose Fulbright US LLP; Gerard Messina

(57) ABSTRACT

A copolymer for constituting a polymer electrolyte for a solid-electrolyte lithium or sodium cell. A polymer electrolyte that is usable in combination with high-voltage cathode active materials and makes it possible to provide solid-electrolyte lithium or sodium cells and/or batteries having a high energy density that is sufficient even for use in electricity-based vehicles, the copolymer encompasses at least two ion-conductive polymers, the copolymer encompassing at least one polymer polymerized by ring-opening polymerization of at least one lactone and/or of at least one lactide and/or of at least one cyclic carbonate and/or of at least one cyclic carbamate and/or of at least one lactam and/or of at least one epoxide, and/or at least one polymer polymerized by radical polymerization of acrylonitrile and/or of at least one acrylonitrile derivative; and encompasses at least one polyacrylate having at least one repeating unit.

19 Claims, 1 Drawing Sheet

(56) References Cited

OTHER PUBLICATIONS

Zhang et al., "Solid polymer electrolyte comprised of lithium salt/ether functionalized ammonium-based polymeric ionic liquid with bis(fluorosulfonyl) imide", Electrochimica ACTA 159, 2015, pp. 93-101.

Niitani et al., "Characteristics of new-type solid polymer electrolyte controlling nano-structure", Journal of Power Sources 146, 2005, pp. 386-390.

Suk et al., "Semi-interpenetrating solid polymer electrolyte based on thiol-ene cross-linker for all-solid-state lithium batteries", Journal of Power Sources 334, 2016, pp. 154-161.

Britz, et al.: "Blends of Poly(meth)acrylates with 2-Oxo-(1,3)dioxolane Side Chains and Liithium Salts as Liithium Ion Conductors", J. Macromolecules 40 (2007), pp. 7558-7565.

Britz, Jochen: "Ion conductivity in polymer matrices—synthesis, characterization and investigation of dynamic processes of new lithium and proton conductors", Dissertation (2009), Max-Planck Institute, pp. 1-216.

Fan, et al.: "Succinonitrile as a Versatile Additive for Polymer Electrolytes", Advance Functional Materilas, 17 (2007), pp. 2800-2807.

Gao, et al.: "A Composite Gel—Polymer/Glass—Fiber Electrolyte for Sodium-Ion Batteries", Adv. Energy Mater. 5 (2015), pp. 1-8.

Ma, et al.: "Rechargeable Na/NaxCoO2 and Na15Pb4/NaxCoO2 Polymer Electrolyte Cells", J. Electrochem. Soc., 140 (10), (1993), pp. 2726-2733.

Niitani, et al.: "Star-Shaped Polymer Eletrolyte with Microphase Separation Structure for All-Solid-State Lithium Batteries", J. Electrochem. Soc, 156 (7), (2009), pp A577-A583.

West, et al.: "Ply(ethylene oxide)-Sodium Perchlorate Electrolytes in Solid-state Sodium Cells", British Polymer J., 20 (1988), pp. 243-246.

Zhang, et al.: "Safety-Reinforced Poly(Propylene Carbonate)-Based All-Solid-State Polymer Electrolyte for Ambient-Temperature Solid Polymer Lithium Batteries", Adv. Energy Mater., 5 (2015), pp. 1-10.

\* cited by examiner

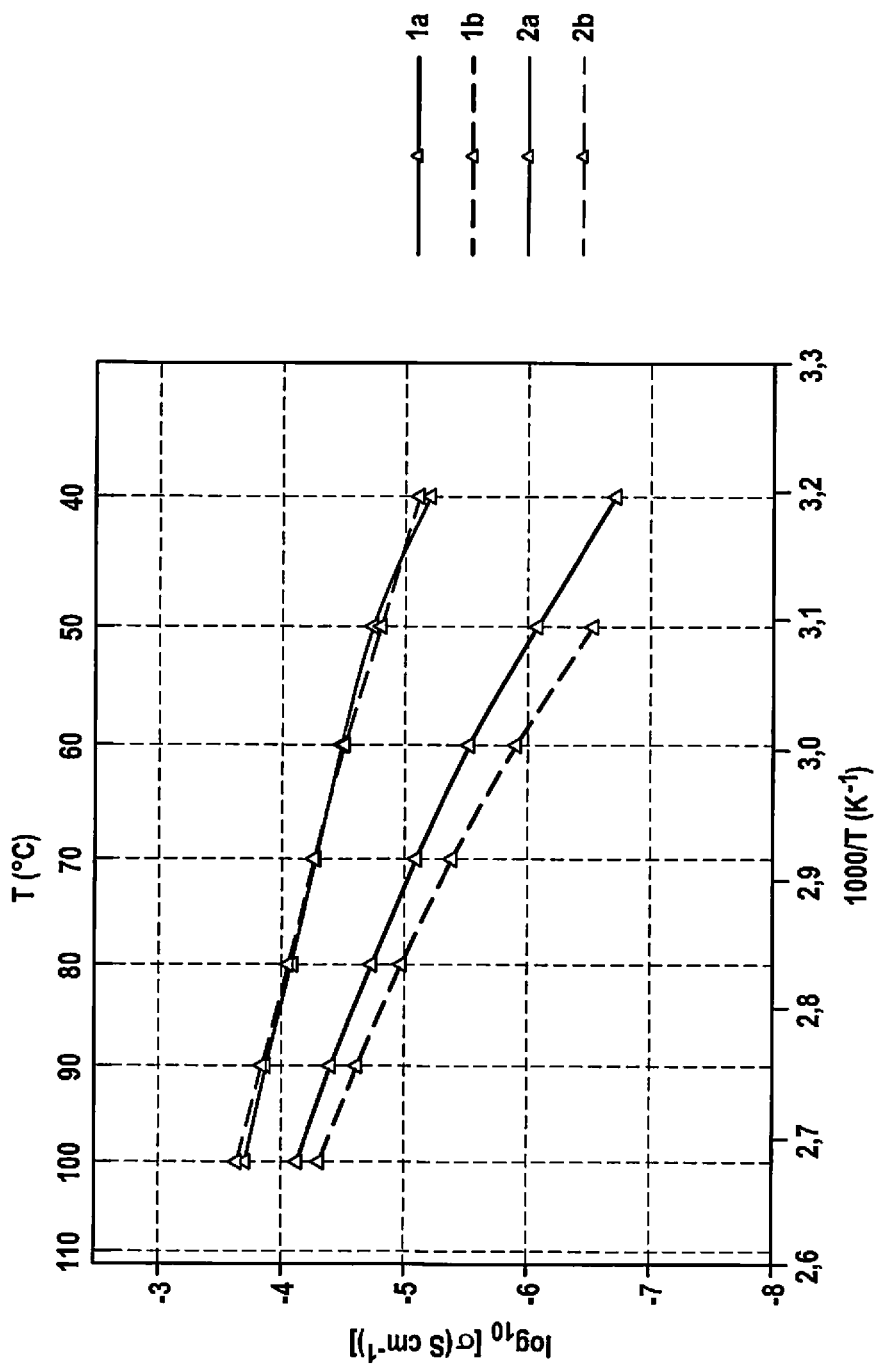

HIGH-VOLTAGE STABLE COPOLYMER FOR CONSTITUTING A POLYMER ELECTROLYTE FOR A LITHIUM OR SODIUM CELL

CROSS REFERENCE

The present application claims the benefit under 35 U.S.C. § 119 of German Patent Application No. DE 102018222593.1 filed on Dec. 20, 2018, which is expressly incorporated herein by reference in its entirety.

FIELD

The present invention relates to a copolymer for constituting a polymer electrolyte for a lithium or sodium cell, to a polymer electrolyte of that kind, and to a manufacturing method therefor; and to a cathode, a separator, a protective layer, an anode, and a cell.

BACKGROUND INFORMATION

Lithium and sodium cells (British Polymer Journal 20 (1987)) have been available for many years.

A more recent development in this sector is represented by solid-electrolyte lithium or sodium cells, for example for secondary batteries, which, in contrast to conventional liquid-electrolyte lithium or sodium cells, use solid electrolytes, such as polymer electrolytes or inorganic ion conductors, instead of liquid electrolytes, and which can have high energy densities, for example of more than 400 Wh/kg, and are very safe in particular because a liquid electrolyte is avoided. At present, however, the performance and operational readiness of solid-electrolyte lithium or sodium cells is usually still limited by solid electrolytes having low ion conductivity and/or by cathode active materials having low capacity.

High-voltage cathode active materials, in particular having a cathode potential ≥4 V, for instance having a cathode potential of about 5 V, can have high capacity.

Conventional polymer electrolytes, however, generally require an electrochemical environment in which the cathode potential remains below, for example, 4.0 V with respect to lithium ($Li^+/Li$), in order to remain stable over a sufficiently large number of cycles and/or a sufficiently long time span, and can become unstable at voltages in the high-voltage range, for example ≥4 V. This interferes with the use of such polymer electrolytes in combination with high-voltage cathode active materials having high capacity, with the result that such polymer electrolytes are usually used only in combination with cathode active materials having a cathode potential of less than 4.0 V with respect to lithium ($Li^+/Li$) and having lower capacity, with the result, however, that the energy density of these systems as a rule is limited to values that are insufficient for use in electric vehicles.

Such problems are discussed in a number of scientific publications, for instance in Advanced Energy Materials 5 (2015) 1402235, Advanced Energy Materials 5 (2015) 1501082, Advanced Functional Materials 17 (2007) 2800, Electrochimica Acta 238 (2017) 21, Electrochimica Acta 212 (2016) 372, Electrochimica Acta 169 (2015) 61, Electrochimica Acta 164 (2015) 108, Electrochimica Acta 159 (2015) 93, Journal of Power Sources 146 (2005) 386, Journal of Power Sources 334 (2016) 154, Journal of Power Sources 298 (2015) 166, Journal of Power Sources 295 (2015) 139, Journal of Power Sources 246 (2014) 846, J. Electrochem. Soc. 156 (2009) A577, J. Electrochem. Soc. 140 (1993) 2726, and Scientific Reports 4 (2014) 3815.

European Patent No. EP 1 215 244 B1 describes a consolidation material for an electrolyte solution of a cell or battery.

SUMMARY

The present invention relates to a copolymer for constituting a polymer electrolyte for a lithium or sodium cell, in particular for a solid-electrolyte lithium or sodium cell. The copolymer can be designed, for example, for constituting a polymer electrolyte for a lithium or sodium battery cell, for instance for a solid-electrolyte lithium or sodium battery cell. The copolymer can be designed, for instance, for constituting a polymer electrolyte for a lithium cell, for instance for a solid-electrolyte lithium cell, for example battery cell.

In particular, the copolymer can encompass at least two ion-conductive polymers. For example, the copolymer can encompass or can be constituted from at least two lithium-ion-conductive or sodium-ion-conductive, in particular lithium-ion-conductive, polymers.

An "ion-conductive, for example lithium-ion-conductive or sodium-ion-conductive, polymer" can be understood in particular as a polymer that itself can be or is devoid of the ions that are to be conducted, for example respectively lithium ions or sodium ions, but is suitable for coordinating and/or solvating the ions that are to be conducted, for example lithium ions or sodium ions, and/or counter-ions, in particular conducting-salt anions, for example lithium conducting-salt anions or sodium conducting-salt anions, and becomes ion-conducting, for example lithium-ion-conducting or sodium-ion-conducting, for example, upon addition of the ions to be conducted, for example lithium ions or sodium ions, for instance in the form of at least one conducting salt, for example a lithium conducting salt or sodium conducting salt. Polymers that have at least one heteroatom, for example oxygen and/or nitrogen and/or sulfur, having at least one free electron pair, for example at least one carbonyl group, for instance at least one carboxylic acid ester group and/or at least one carbonate group, and/or at least one ether group and/or at least one nitrile group, can be suitable, in particular, for coordinating and/or solvating the ions to be conducted, for example lithium ions or sodium ions, and/or counter-ions, in particular conducting-salt anions, for example lithium conducting-salt anions or sodium conducting-salt anions.

The copolymer encompasses in particular (at least)

at least one polymer polymerized by ring-opening polymerization of at least one lactone and/or of at least one lactide and/or of at least one cyclic carbonate and/or of at least one cyclic carbamate and/or of at least one lactam and/or of at least one epoxide, and/or at least one polymer polymerized by radical polymerization of acrylonitrile and/or of at least one acrylonitrile derivative; and/or at least one polyacrylate having at least one repeating unit of the general chemical formula:

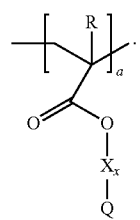

A "polyacrylate" can be understood in particular as a polymer that is polymerized by polymerization, for instance by radical polymerization, of at least one acrylic acid ester and/or of at least one acrylic acid ester derivative. The term "polyacrylate" therefore also encompasses polymers, polymerized by polymerization of acrylic acid ester derivatives, whose polymer backbone can have, in particular instead of hydrogen, the substituent R.

a denotes, in particular, the number of repeating units.

R can denote, in particular, hydrogen or a halogen, in particular fluorine, or an alkyl group, for example a methyl group or ethyl group or propyl group or butyl group, or a nitrile group or an alkoxy group, for example an ethoxy group or methoxy group, or an oligo- or polyalkylene oxide group, in particular an oligo- or polyethylene oxide group, or a silyl group, for example a trimethylsilyl group or triethylsilyl group.

X denotes, in particular, a spacer, in particular a spacer bound, for example covalently, to the acrylate unit that forms the polymer backbone. x denotes the quantity, in particular the presence or absence, of the spacer X. x can be, in particular, 1 or 0. In the case in which x=1, in particular, a spacer X can be present. In the case in which x=0, in particular, no spacer can be present. The group Q can be attached, for example covalently, to the spacer X (in the case where x=1, presence of the spacer) or, in particular directly, for example covalently, to the acrylate unit that forms the polymer backbone (in the case in which x=0, absence of spacer). Q denotes in particular a carbonate group, for example a cyclic carbonate group or an acyclic carbonate group, in particular a cyclic carbonate group, or a carboxylic acid ester group, for example a lactone group or an acyclic carboxylic acid ester group, in particular a lactone group, or an acetal group, for example a cyclic acetal group or an acyclic acetal group, or a carbamate group, for example a cyclic carbamate group or an acyclic carbamate group, in particular an acyclic carbamate group, or a lactam group or a nitrile group or an isonitrile group, and a cyanate group or an isocyanate group or a thiol group or a thiocyanate group or an isothiocyanate group or a thiocarbonyl group or a silyl group.

Such copolymers can advantageously exhibit sufficient stability at potentials of more than 4.0 V, in particular ≥4.5 V or even ≥5.0 V, with respect to lithium ($Li^+/Li$), and can therefore also be used in combination with high-voltage cathode active materials having a cathode potential ≥4 V, for example ≥4.5 V or even about 5 V. Such copolymers can advantageously also have sufficient long-term stability, for example over several hundred cycles, even in the presence of high-voltage cathode active materials having an upper shutoff voltage greater than or equal to 4.5 V with respect to lithium ($Li^+/Li$), for instance $LiMn_xFe_yPO_4$ (LMFP) and/or $LiCoPO_4$, for example in a composite cathode or impregnated into a porous cathode and/or in a complete cell. Such polymers can furthermore also advantageously exhibit a low glass transition temperature and can thus, for example in the presence of suitable quantities of conducting salt that can be mixed therewith and/or dissolved therein, also exhibit sufficiently high ion conductivity, in particular of at least $10^{-5}$ $S*cm^{-1}$, in particular also approximately $≥10^{-4}$ $S*cm^{-1}$, at a temperature of 80° C., or if applicable even already at a temperature of 40° C. In addition, such copolymers can also form, on lithium-metal anodes and/or sodium-metal anodes, a stable boundary layer or intermediate layer that can prevent a rise in contact resistance which is otherwise observable at those interfaces.

Such copolymers thus make it possible to furnish polymer electrolytes for lithium or sodium cells and/or batteries which can be used in combination with high-voltage cathode active materials, and which make it possible to provide solid-electrolyte lithium or sodium cells and/or batteries, which can also be referred to, for example, as solid or polymer or polymer-electrolyte lithium or sodium cells and/or batteries, having an energy density that is sufficiently high even for use in electricity-based vehicles, such as electric vehicles and/or hybrid vehicles. By way of a sodium-metal anode it is possible to achieve a potential that is approximately 300 mV higher than with a lithium-metal anode, and for that reason such copolymers can also be relevant or in fact particularly advantageous in combination with high-voltage cathode active materials for sodium cells, or can be used in sodium cells.

Because copolymers of this kind can already, as such, exhibit sufficient high-voltage stability, an addition of adjuvants to increase the high-voltage stability, for example ionic liquids, plasticizers, inorganic polymers, special salts, and/or fillers, can furthermore advantageously be decreased or even avoided, with the result that undesired side reactions, for example a reaction of liquid plasticizers with lithium metal, can be avoided, and/or costs can be lowered, and/or processes can be simplified and, for example, made suitable for mass production.

All in all, it is thereby possible to furnish, in a simple, inexpensive manner that is suitable for mass production, a polymer electrolyte that is usable in combination with high-voltage cathode active materials and makes it possible to provide lithium or sodium cells and/or batteries, for example solid-electrolyte lithium or sodium cells and/or batteries, in particular battery cells, having a high energy density that is sufficiently high in particular even for use in electricity-based vehicles such as electric vehicles and/or hybrid vehicles.

X can, for instance, encompass or be constituted from a, for example unhalogenated or halogenated, for instance unfluorinated or fluorinated, alkylene group, for example a methylene group and/or ethylene group and/or propylene group and/or butylene group, and/or a, for example unhalogenated or halogenated, for instance unfluorinated or fluorinated, alkyl group, for example a methyl group and/or ethyl group and/or propyl group and/or butyl group, and/or a carbonyl group, for instance a carbonate group and/or a carboxylate group and/or an anhydride group and/or an enone group and/or a carboxylic acid ester group and/or an amide group and/or an imide group and/or a ketone group and/or an aldehyde group and/or a, for example unhalogenated or halogenated, for instance unfluorinated or fluorinated, alkylene oxide group, for example an oligo- or polyalkylene oxide group, for instance an oligo- or polyethylene oxide group, and/or a, for example unhalogenated or halogenated, for instance unfluorinated or fluorinated, alkoxy group, for example an ethoxy group or methoxy group, and/or a, for example unhalogenated or halogenated, for instance unfluorinated or fluorinated, benzylene group and/or a, for example unhalogenated or halogenated, for instance unfluorinated or fluorinated, benzylene group and/or at least one nitrile group and/or at least one silyl group, for example at least one trimethylsilyl group and/or at least one triethylsilyl group. Suitable heteroatoms, for example oxygen in the case of a carboxylic acid ester group and/or nitrogen in the case of amide group and/or imide group, can, if applicable, have at least one substituent, for instance one substituent in the case of the oxygen of a carboxylic acid ester group and the nitrogen of an imide group, and two substituents in the case of the nitrogen of an amide group, for instance in the form of an alkyl group having a chain length from ≥1 to ≤15 carbon atoms.

In the context of an example embodiment of the present invention, the copolymer has a molecular weight ≥20 kD, in particular in a range from ≥20 kD to ≤200 kD. It is thereby advantageously possible to furnish sufficiently high temperature stability, for example up to 150° C. in a standard atmosphere, and sufficiently high mechanical stability to ensure the dimensional stability of a composite electrode based thereon and, even at temperatures approximately 20° C. above usual operating temperatures, to remain in porous structures and, for example, not flow out.

In the context of a further embodiment of the present invention, the copolymer has a polydispersity index or polydispersity of less than 1.5, for example ≤1.4, for instance ≤1.3. Diffusion of short-chain copolymer components in the polymer electrolyte and, for example, also undesired side reactions that may result therefrom, as well as impediments to mobility due to excessively long-chain copolymer components, can thereby be decreased or avoided, and more-homogeneous ion conduction can thereby be achieved. This can be particularly relevant in the context of copolymers, in particular as compared with homopolymers.

In the context of a further embodiment of the present invention, the copolymer encompasses at least one polymer polymerized by ring-opening polymerization of at least one lactone and/or of at least one lactide and/or of at least one cyclic carbonate and/or of at least one cyclic carbamate and/or of at least one lactam and/or of at least one epoxide. The copolymer can encompass in particular at least one polymer polymerized by ring-opening polymerization of at least one lactone and/or of at least one lactide and/or of at least one cyclic carbonate and/or of at least one cyclic carbamate and/or of at least one lactam. The copolymer can thereby be produced in simple fashion and, in particular, can have easily adjustable properties.

In the context of a further embodiment of the present invention, the at least one polymer polymerized by ring-opening polymerization is polymerized by ring-opening polymerization of at least one lactone and/or of at least one cyclic carbonate. This has proven to be advantageous in terms of achieving high ion conductivity and high electrochemical stability.

For example, the at least one polymer polymerized by ring-opening polymerization can be polymerized by ring-opening polymerization of at least one lactone, in particular at least one caprolactone, for example of ε-caprolactone, and/or of at least one valerolactone, for example δ-valerolactone and/or at least one alkyl-δ-valerolactone, and/or of at least one butyrolactone, for example β-butyrolactone and/or γ-butyrolactone, and/or of at least one propiolactone, for example β-propiolactone, and/or of at least one lactone having a ring size ≥8 ring-forming atoms, for example at least one pentadecalactone, for example ω-pentadecalactone, for instance having a ring size of 16 ring-forming atoms, and/or of at least one cyclic carbonate, in particular of at least one dioxanone, for example of at least one 1,3-dioxan-2-one, for instance trimethylene carbonate and/or propylene carbonate and/or 2,2-dimethyltrimethylene carbonate, and/or of at least one 1,4-dioxan-2-one.

In particular, the at least one polymer polymerized by ring-opening polymerization can be polymerized by ring-opening polymerization of at least one lactone, in particular of at least one caprolactone, for example ε-caprolactone, and/or of at least one valerolactone, for example δ-valerolactone and/or at least one alkyl-δ-valerolactone, and/or of at least one butyrolactone, for example β-butyrolactone and/or γ-butyrolactone, and/or of at least one propiolactone, for example β-propiolactone, and/or of at least one lactone having a ring size ≥8 ring-forming atoms, for example at least one pentadecalactone, for example ω-pentadecalactone, for instance having a ring size of 16 ring-forming atoms. This has proven to be particularly advantageous in terms of achieving high ion conductivity and high electrochemical stability.

Polymers polymerized by ring-opening polymerization of at least one lactone can also be referred to as "polylactones."

In the context of a further embodiment, the at least one polymer polymerized by ring-opening polymerization encompasses or is constituted from at least one repeating unit of the general chemical formula

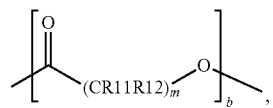

in which, in particular, b can denote the number of repeating units.

R11 and R12 can denote in particular, mutually independently in each case, hydrogen or a halogen, in particular fluorine, or an alkyl group, for example a methyl group or ethyl group or propyl group or butyl group, or a nitrile group or an alkoxy group, for example an ethoxy group or methoxy group, or an oligo- or polyalkylene oxide group, in particular an oligo- or polyethylene oxide group, or a silyl group, for example a trimethylsilyl group or triethylsilyl group. For example, R11 and R12 can denote, mutually independently in each case, hydrogen or a halogen, for instance fluorine.

m can denote, in particular, the number of CR11R12 units. In particular, it can be the case that 1≤m≤14, for example 2≤m≤14, for instance 3≤m≤7.

In the context of a further embodiment of the present invention, the at least one polymer polymerized by ring-opening polymerization is polymerized by ring-opening polymerization of at least one caprolactone.

In the context of a special embodiment, the at least one polymer polymerized by ring-opening polymerization is polymerized by ring-opening polymerization of ε-caprolactone. This has proven to be particularly advantageous in terms of achieving high ion conductivity and high electrochemical stability. In the general chemical formula above, in particular, R11 and R12 can denote hydrogen and m can equal 5, or the at least one polymer polymerized by ring-opening polymerization can encompass or be constituted from at least one polymer having at least one repeating unit of the general chemical formula

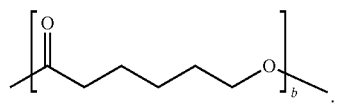

In the context of a further embodiment, the at least one polymer polymerized by ring-opening polymerization has the highest number of monomers of the polymers of the copolymer. This has proven to be particularly advantageous in terms of achieving high ion conductivity.

In the context of a further embodiment, more than 50%, in particular ≥55% to ≤95%, for example ≥60% to ≤90%, based on the sum of the number of monomers of all polymers of the copolymer, of the monomers in the copolymer constitute the at least one polymer polymerized by ring-opening polymerization. This has proven to be particularly advantageous in terms of achieving high ion conductivity.

In the context of a further embodiment, Q denotes a carbonate group, in particular a cyclic carbonate group or an acyclic carbonate group, or a carboxylic acid ester group, in particular a lactone group, or an acyclic carboxylic acid ester group, or an acetal group, in particular a cyclic acetal group or an acyclic acetal group, or a carbamate group, in particular a cyclic carbamate group or an acyclic carbamate group, or a nitrile group or a silyl group.

Carbonate groups, carboxylic acid ester groups, acetal groups, carbamate groups, and nitrile groups have proven to be advantageous in terms of achieving high ion conductivity and high electrochemical stability.

With silyl groups it is possible to, in particular considerably, improve electrochemical stability.

In the context of a configuration of this embodiment, Q denotes a cyclic carbonate group or a cyclic acetal group or a lactone group or an acyclic carboxylic acid ester group or an acyclic carbamate group or a nitrile group or a silyl group.

For example, Q can denote a cyclic carbonate group or a cyclic acetal group or an acyclic carboxylic acid ester group or an acyclic carbamate group or a nitrile group or a silyl group.

In the context of a special configuration of this embodiment, Q denotes a dioxolane group, for example a 2-oxo-1,3-dioxolane group, for instance a (2-oxo-1,3-dioxolan-4-yl) group, for example a (2-oxo-1,3-dioxolan-4-yl)alkyl group, for instance a (2-oxo-1,3-dioxolan-4-yl)butyl group or (2-oxo-1,3-dioxolan-4-yl)propyl group or (2-oxo-1,3-dioxolan-4-yl)ethyl group or (2-oxo-1,3-dioxolan-4-yl)methyl group, or a (2-oxo-1,3-dioxolan-4-yl) group, or a 1,3-dioxolane group, for instance a (1,3-dioxolan-4-yl) group, for example a (1,3-dioxolan-4-yl)alkyl group, for instance a (1,3-dioxolan-4-yl)butyl group or (1,3-dioxolan-4-yl)propyl group or (1,3-dioxolan-4-yl)ethyl group or (1,3-dioxolan-4-yl)methyl group or (1,3-dioxolan-4-yl) group, or an acetoxy group or an [(alkylamino)carbonyl]oxy group, for instance a [(butylamino)carbonyl]oxy group, or a nitrile group or a silyl group, for example a trimethylsilyl group or a triethylsilyl group.

In the context of a special embodiment, the at least one polyacrylate encompasses or is constituted from at least one repeating unit of the general chemical formula

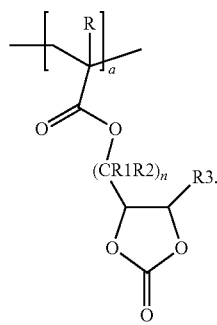

This has proven to be particularly advantageous in terms of achieving high ion conductivity and high electrochemical stability.

a denotes in particular the number of repeating units.

R1, R2, and R3 can denote in particular, mutually independently in each case, hydrogen or a halogen, in particular fluorine, or an alkyl group, for example a methyl group or ethyl group or propyl group or butyl group, or a nitrile group or an alkoxy group, for example an ethoxy group or methoxy group, or an oligo- or polyalkylene oxide group, in particular an oligo- or polyethylene oxide group, or a silyl group, for example a trimethylsilyl group or triethylsilyl group.

n denotes in particular the number of CR1R2 units. It can be the case in particular that 0≤n≤10, for example 0≤n≤8.

In the context of a further special configuration of this embodiment, R1, R2, and R3 denote, mutually independently in each case, hydrogen or a halogen, in particular fluorine. R1, R2, and R3 can denote, in particular, hydrogen.

In the context of a further special configuration of this embodiment, 0 n 4.

In the context of a further embodiment, the copolymer encompasses the general chemical formula

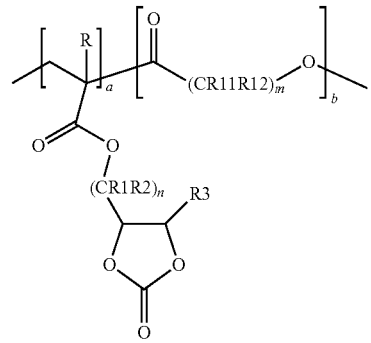

This has proven to be particularly advantageous in terms of achieving high ion conductivity and high electrochemical stability. It can be the case in particular that b>a. In particular, the copolymer can be a block copolymer.

In the context of a special configuration of this embodiment, the copolymer encompasses the general chemical formula

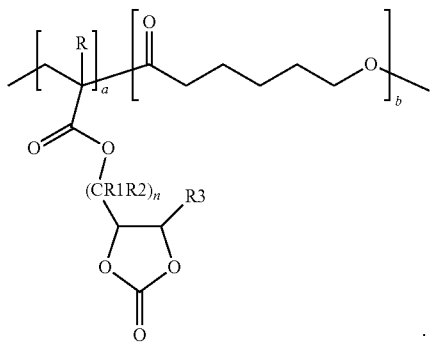

It can be the case in particular that b>a. In particular, the copolymer can be a block copolymer. For instance, the copolymer can encompass or be a polycaprolactone-block-poly(2-oxo-1,3-dioxolan-4-yl)alkyl acrylate block copolymer and/or a polycaprolactone-block-poly(2-oxo-1,3-dioxolan-4-yl) acrylate block copolymer (PCL-block-PDO(A)A), for example having a monomer ratio of caprolactone to (2-oxo-1,3-dioxolan-4-yl)alkyl acrylate (CL:DOAA), or of caprolactone to (2-oxo-1,3-dioxolan-4-yl)acrylate) (CL: DOA), greater than or equal to 50:50, for instance 70:30. Block copolymers of this kind can advantageously exhibit high ion conductivity and, for example, also high electrochemical stability.

In the context of another alternative or additional special embodiment, the copolymer encompasses at least one polyacrylate having at least one nitrile group. For example, the copolymer can encompass, in particular alternatively or additionally, at least one polyacrylate having at least one repeating unit of the general chemical formula

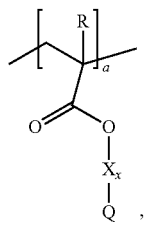

where a, R, X, x, and Q can be configured in principle as already explained, but in particular Q and/or X and/or R can encompass or be at least one nitrile group. For example, at least Q can denote a nitrile group. Nitrile groups advantageously make it possible to, in particular considerably, improve electrochemical stability and also to furnish sufficiently high ion conductivity.

In the context of a special configuration of this embodiment, the copolymer, in particular alternatively or additionally, encompasses or is constituted from at least one polyacrylate having at least one repeating unit of the general chemical formula

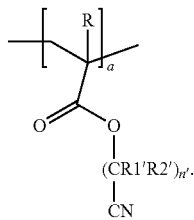

High ion conductivity and high electrochemical stability can thereby be achieved.

a denotes, in particular, the number of repeating units.

R1' and R2' can denote in particular, mutually independently in each case, hydrogen or a halogen, in particular fluorine, or an alkyl group, for example a methyl group or ethyl group or propyl group or butyl group, or a nitrile group or an alkoxy group, for example an ethoxy group or methoxy group, or an oligo- or polyalkylene oxide group, in particular an oligo- or polyethylene oxide group, or a silyl group, for example a trimethylsilyl group or triethylsilyl group.

n' denotes in particular the number of CR1'R2' units. It can be the case in particular that $1 \leq n' \leq 10$, for example $1 \leq n' \leq 8$.

In the context of a further special configuration of this embodiment, R1' and R2' denote, mutually independently in each case, hydrogen or a halogen, in particular fluorine. In particular, R1' and R2' can denote hydrogen.

In the context of a further special configuration of this embodiment, $1 \leq n' \leq 4$, for example $2 \leq n' \leq 4$. For instance, it can be the case that n'=2, produced e.g. by polymerization of cyanoethyl acrylate (CEA), or n'=4, produced e.g. by polymerization of cyanobutyl acrylate (CBA).

In the context of a further embodiment, the copolymer encompasses the general chemical formula

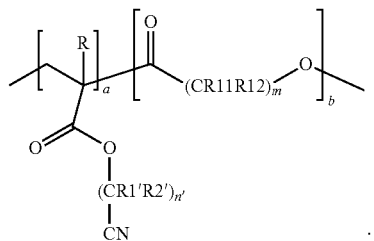

This can be particularly advantageous in terms of achieving high ion conductivity and high electrochemical stability. It can be the case in particular that b>a. In particular, the copolymer can be a block copolymer.

In the context of a special configuration of this embodiment, the copolymer encompasses the general chemical formula

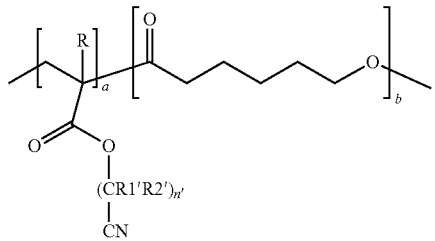

It can be the case in particular that b>a. In particular, the copolymer can be a block copolymer. For instance, the copolymer can encompass or be a polycaprolactone-block-polycyanoethyl acrylate block copolymer (PCL-block-PCEA) and/or a polycaprolactone-block-polycyanobutyl acrylate block copolymer (PCL-block-PCBA), for example having a monomer ratio of caprolactone to cyanoethyl acrylate (CL:CEA), or of caprolactone to cyanobutyl acrylate (CL:CBA), greater than or equal to 50:50, for instance 70:30. Block copolymers of this kind can advantageously exhibit high ion conductivity and, for example, also high electrochemical stability.

In the context of another, alternative or additional, special embodiment, the copolymer encompasses at least one polyacrylate having at least one silyl group, for example having at least one trimethylsilyl group or having at least one triethylsilyl group. For instance, the copolymer can encompass, in particular alternatively or additionally, at least one polyacrylate having at least one repeating unit of the general chemical formula

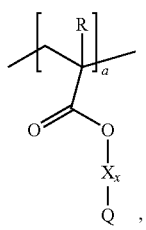

where a, R, X, x, and Q can be configured in principle as already explained, except that in particular Q and/or X and/or R can encompass or be at least one silyl group, for example at least one trimethylsilyl group and/or at least one triethylsilyl group. For instance, at least Q can denote a silyl group, for example a trimethylsilyl group or a triethylsilyl group. Silyl groups advantageously make it possible to, in particular considerably, improve electrochemical stability. Ion conductivity can be furnished by other components of the copolymer, in particular the unit of the polyacrylate which forms the polymer backbone, and/or the spacer, and/or the at least one polymer polymerized by ring-opening polymerization, and/or the at least one polymer polymerized by radical polymerization of acrylonitrile and/or of at least one acrylonitrile derivative, and/or the at least one further ion-conductive polymer explained later.

In the context of a special configuration of this embodiment, the copolymer, in particular alternatively or additionally, encompasses or is constituted from at least one polyacrylate having at least one repeating unit of the general chemical formula

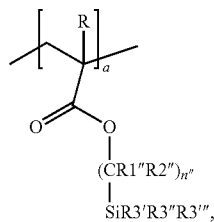

where a denotes in particular the number of repeating units.

R1" and R2" can denote in particular, mutually independently in each case, hydrogen or a halogen, in particular fluorine, or an alkyl group, for example a methyl group or ethyl group or propyl group or butyl group, or a nitrile group or an alkoxy group, for example an ethoxy group or methoxy group, or an oligo- or polyalkylene oxide group, in particular an oligo- or polyethylene oxide group, or a silyl group, for example a trimethylsilyl group or triethylsilyl group.

n" denotes in particular the number of $CR1''R2''$ units. It can be the case in particular that $0 \leq n'' \leq 10$, for example $0 \leq n'' \leq 8$.

R3', R3", and R3''' can denote in particular, mutually independently in each case, an alkyl group, for example a methyl group or ethyl group or propyl group or butyl group. For instance, R3', R3", and R3''' can each denote a methyl group or an ethyl group.

In the context of a further special configuration of this embodiment, R1" and R2", mutually independently in each case, denote hydrogen or a halogen, in particular fluorine. In particular, R1" and R2" can denote hydrogen.

In the context of a further special configuration of this embodiment, $0 \leq n'' \leq 4$, for example $1 \leq n'' \leq 4$.

In the context of a further embodiment, the copolymer encompasses the general chemical formula

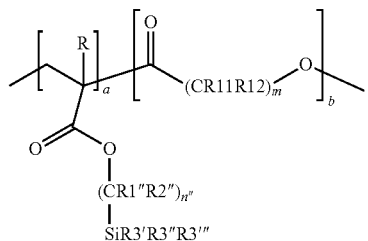

This can be particularly advantageous in terms of achieving, in particular, high electrochemical stability and sufficiently high ion conductivity. It can be the case in particular that $b > a$. In particular, the copolymer can be a block copolymer.

In the context of a special configuration of this embodiment, the copolymer encompasses the general chemical formula

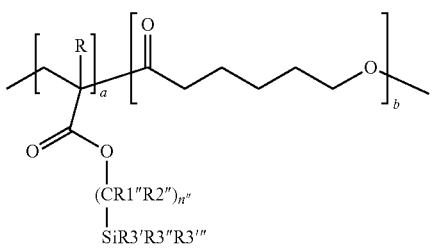

It can be the case in particular that $b > a$. In particular, the copolymer can be a block copolymer.

In the context of a special configuration of these embodiments, R denotes hydrogen or an alkyl group, for example a methyl group, or a nitrile group or a silyl group. R can denote in particular hydrogen or an alkyl group, for example a methyl group.

In the context of a further embodiment, the at least one polymer polymerized by radial polymerization of acrylonitrile and/or of at least one acrylonitrile derivative encompasses or is constituted from at least one repeating unit of the general chemical formula

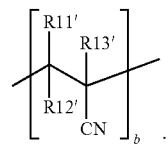

In particular, b can denote the number of repeating units.

R11', R12', and R13' can denote in particular, mutually independently in each case, hydrogen or a halogen, in particular fluorine, or an alkyl group, for example a methyl group or ethyl group or propyl group or butyl group, or a nitrile group or an alkoxy group, for example an ethoxy group or methoxy group, or an oligo- or polyalkylene oxide group, in particular an oligo- or polyethylene oxide group, or a silyl group, for example a trimethylsilyl group or triethylsilyl group. For example, R11', R12', and R13' can denote, mutually independently in each case, hydrogen or a halogen, for instance fluorine.

In the context of a further embodiment, the copolymer encompasses the general chemical formula

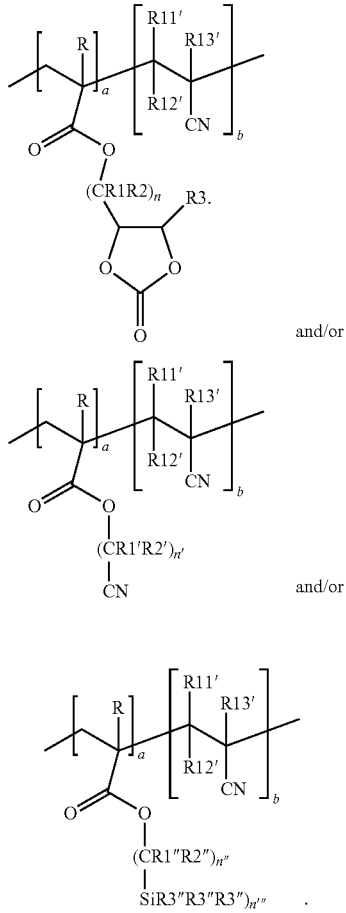

and/or

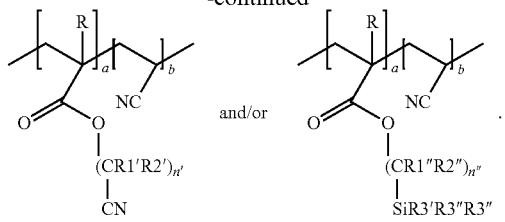

The copolymer can be, in particular, a statistical copolymer and/or a block copolymer.

If applicable, the copolymer can be constituted from at least two ion-conductive, for example lithium-ion-conductive or sodium-ion-conductive, in particular lithium-ion-conductive, polymers, for example from the at least one polymer constituted by ring-opening polymerization and from the at least one polyacrylate, or from the at least one polymer polymerized by radial polymerization and from the at least one polyacrylate.

The copolymer can, however, for example, also encompass or be constituted from at least three ion-conductive, for example lithium-ion-conductive or sodium-ion-conductive, in particular lithium-ion-conductive, polymers. If applicable, the copolymer can also encompass or be constituted from at least four ion-conductive, for example lithium-ion-conductive or sodium-ion-conductive, in particular lithium-ion-conductive, polymers.

In the context of a further embodiment, the copolymer encompasses at least one further ion-conductive polymer. The at least one further ion-conductive polymer can encompass in particular at least one heteroatom, in particular oxygen and/or nitrogen and/or sulfur, having at least one free electron pair. For example, the at least one further lithium-ion-conductive polymer can be an uncharged polymer.

In a configuration of this embodiment, the at least one further ion-conductive polymer encompasses or is constituted from at least one nitrile group and/or at least one isonitrile group and/or at least one cyanate group and/or at least one isocyanate group and/or at least one thiol group and/or at least one thiocyanate group and/or at least one isothiocyanate group and/or at least one, in particular cyclic or acyclic, acetal group, for instance at least one 1,3-dioxolane group, for example at least one (1,3-dioxolan-4-yl) group, for instance at least one (1,3-dioxolan-4-yl)alkyl group, for example at least one (1,3-dioxolan-4-yl)butyl group and/or (1,3-dioxolan-4-yl)propyl group and/or (1,3-dioxolan-4-yl)ethyl group and/or (1,3-dioxolan-4-yl)methyl group, and/or at least one (1,3-dioxolan-4-yl) group, and/or at least one carbonyl group, in particular at least one, in particular cyclic or acyclic, carboxylic acid ester group, for example at least one acyclic carboxylic acid ester group, for instance at least one acetoxy group, and/or at least one lactone group, and/or at least one, in particular cyclic or acyclic, carbonate group, for example at least one cyclic carbonate group, for instance at least one 2-oxo-1,3-dioxolane group, for example at least one (2-oxo-1,3-dioxolan-4-yl) group, for instance at least one (2-oxo-1,3-dioxolan-4-yl)alkyl group, for example at least one (2-oxo-1,3-dioxolan-4-yl)butyl group and/or (2-oxo-1,3-dioxolan-4-yl)propyl group and/or (2-oxo-1,3-dioxolan-4-yl)ethyl group and/or (2-oxo-1,3-dioxolan-4-yl)methyl group, and/or at least one (2-oxo-1,3-dioxolan-4-yl) group, and/or at least one, in particular cyclic or acyclic, carbamate group, for example at least one [(alkylamino)carbonyl]oxy group, for instance at least one [butylamino)carbonyl]oxy group, and/

The copolymer can be, in particular, a statistical copolymer and/or a block copolymer.

In the context of a further embodiment, the at least one polymer polymerized by radial polymerization of acrylonitrile and/or of at least one acrylonitrile derivative encompasses or is polyacrylonitrile.

In the context of a special configuration of this embodiment, the copolymer encompasses the general chemical formula

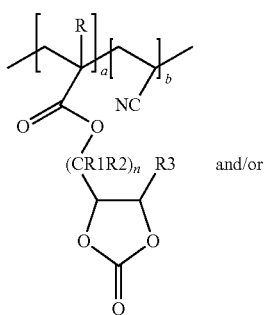

and/or or at least one thiocarbonyl group and/or at least one ether group and/or at least one silyl group, for example at least one trimethylsilyl group and/or at least one triethylsilyl group.

In the context of a configuration of this embodiment, the at least one further ion-conductive polymer encompasses at least one silyl group, for example at least one trimethylsilyl group and/or at least one triethylsilyl group. For instance, the at least one further ion-conductive polymer can encompass or be a polymer having ion-conductive repeating units connected via silyl groups, for instance alkylene oxide units, such as ethylene oxide units. Electrochemical stability advantageously can be, in particular considerably, improved by way of silyl groups.

In the context of another, alternative or additional configuration of this embodiment, the at least one further ion-conductive polymer encompasses or is at least one nitrile group. For instance, the at least one further ion-conductive polymer can encompass or be the at least one polymer, for example polyacrylonitrile, polymerized by radical polymerization of acrylonitrile and/or of at least one acrylonitrile derivative.

In the context of a further embodiment, the copolymer therefore encompasses the at least one polymer polymerized by ring-opening polymerization;

the at least one polymer, in particular polyacrylonitrile, polymerized by radical polymerization; and the at least one polyacrylate.

In the context of a further embodiment, the copolymer encompasses at least one segment A, for example a block A, and one segment B, for example a block B.

Segment A, for instance block A, can encompass, for example, the at least one polymer polymerized by ring-opening polymerization, and/or the at least one polymer polymerized by radical polymerization of acrylonitrile and/or of at least one acrylonitrile derivative, and/or the at least one polyacrylate.

Segment B, for example block B, can encompass, for example, the at least one polyacrylate or the at least one polymer polymerized by ring-opening polymerization, and/or the at least one polymer polymerized by radical polymerization of acrylonitrile and/or of at least one acrylonitrile derivative.

For instance, if segment A, for instance block A, encompasses the at least one polymer polymerized by ring-opening polymerization, segment B, for instance block B, can encompass, for example, the at least one polyacrylate.

Conversely thereto, for instance, if segment A, for instance block A, encompasses the at least one polyacrylate, segment B, for instance block B, can, for example, encompass the at least one polymer polymerized by ring-opening polymerization.

For example, if segment A, for instance block A, encompasses the at least one polyacrylate, segment B, for instance block B, can, however, for example, also encompass the at least one polymer polymerized by radical polymerization of acrylonitrile and/or of at least one acrylonitrile derivative. Because both the at least one polymer polymerized by radical polymerization of acrylonitrile and/or of at least one acrylonitrile derivative, for example polyacrylonitrile, and the at least one polyacrylate, can be polymerized by radical polymerization, it is possible in that context also to constitute a statistical copolymer.

It is furthermore possible, for example, for example if segment A, for instance block A, encompasses the at least one polymer polymerized by ring-opening polymerization, for segment B, for instance block B, to be able to encompass the at least one polyacrylate and the at least one polymer polymerized by radical polymerization of acrylonitrile and/or of at least one acrylonitrile derivative. Because both the at least one polymer, for example polyacrylonitrile, polymerized by radical polymerization of acrylonitrile and/or of at least one acrylonitrile derivative, and the at least one polyacrylate, can be polymerized by radical polymerization, it is possible in that context for segment B, in particular block B, itself to be a statistical copolymer.

It is furthermore possible, for example, for the copolymer additionally to encompass a segment C, for instance a block C (and if applicable a segment D, for instance a block D), which encompasses the at least one polymer polymerized by radical polymerization of acrylonitrile and/or of at least one acrylonitrile derivative and/or the at least one further ion-conductive polymer. For instance, segment A, for instance block A, can encompass the at least one polymer polymerized by ring-opening polymerization, and segment B, for instance block B, can encompass at least one polyacrylate; or conversely, segment A, for instance block A, can encompass the at least one polyacrylate, and segment B, for instance block B, can encompass the at least one polymer polymerized by ring-opening polymerization.

The copolymer can be, for example, a block copolymer, for instance a linear block copolymer, for example of the general formula A-block-B, or a tapered or inverse-tapered block copolymer, or a linear statistical copolymer, for example of the general formula A-stat-B, or a linear alternating copolymer, for example of the general formula A-alt-B, or a graft copolymer, for example in which the polymer backbone can be a homopolymer or a copolymer and in which the side chains encompass segments A and B (and if applicable C and/or D), or a branched or star-shaped copolymer or a crosslinked copolymer or a, for example uncrosslinked or crosslinked mixture, and/or one embodied in the form of an interpenetrating network, of two or more of the copolymer configurations described above.

The copolymer can be manufactured, in particular, by way of a method according to the present invention.

With regard to further technical features and advantages of the copolymer according to the present invention, reference is herewith made explicitly to the explanations in conjunction with the method according to the present invention, the polymer electrolyte according to the present invention, the cathode according to the present invention, the separator according to the present invention, the protective layer according to the present invention, the anode according to the present invention, and the cell according to the present invention, and to the exemplifying embodiments, the FIGURE, and the description of the FIGURE.

A further subject of the present invention is a polymer electrolyte for a lithium or sodium cell, in particular for a solid-electrolyte lithium or sodium cell, which encompasses at least one copolymer according to the present invention. For example, the polymer electrolyte can be designed for a lithium or sodium battery cell, for instance for a solid-electrolyte lithium or sodium battery cell. For instance, the polymer electrolyte can be designed for a lithium cell, for instance for a solid-electrolyte lithium cell, for example battery cell.

In the context of an embodiment, the polymer electrolyte further encompasses at least one lithium or sodium conducting salt, in particular lithium conducting salt.

For example, the at least one lithium conducting salt can encompass or be lithium hexafluorophosphate and/or lithium bis(trifluoromethanesulfonyl)imide and/or lithium tetrafluoroborate and/or lithium tris(pentafluoroethane) trifluorophosphate and/or lithium dicyano(trifluoromethyl)imidazole and/or lithium fluorosulfonyl(trifluoromethanesulfonyl)imide and/or lithium bisoxalatoborate and/or lithium trifluoromethanesulfonate and/or lithium difluorooxalatoborate and/or lithium bisfluorosulfonylimide and/or lithium bis(pentafluoroethanesulfonyl)imide and/or lithium [1,2-benzenediolato(2-)0,0'-oxalato]borate and/or lithium [3,5-bis(trifluoromethyl)pyrazolide] and/or lithium [5-(perfluorobutyl)-3-(trifluoromethyl)pyrazolide] and/or lithium [trifluoro(perfluorophenyl) borate and/or lithium tetracyanoborate and/or lithium trisoxalatophosphate and/or lithium tetrafluorooxalatophosphate and/or lithium (pentafluoroethane) trifluoroborate.

The polymer electrolyte can encompass, for example, ≥10 wt % to ≤30 wt %, for example ≥15 wt % to ≤25 wt %, based on the total weight of the polymer electrolyte, of the at least one lithium or sodium conducting salt, in particular lithium conducting salt.

The polymer electrolyte can be manufactured in particular by way of a method according to the present invention.

With regard to further technical features and advantages of the polymer electrolyte according to the present invention, reference is herewith made explicitly to the explanations in conjunction with the method according to the present invention, the copolymer according to the present invention, the cathode according to the present invention, the separator according to the present invention, the protective layer according to the present invention, the anode according to the present invention, and the cell according to the present invention, and to the exemplifying embodiments, the FIGURE, and the description of the FIGURE.

A further subject of the present invention is a method for manufacturing a copolymer for constituting a polymer electrolyte for a lithium or sodium cell, for example for a solid-electrolyte lithium or sodium cell, in particular for manufacturing a copolymer according to the present invention, and/or for manufacturing a polymer electrolyte for a lithium or sodium cell, for example for a solid-electrolyte lithium or sodium cell, in particular for manufacturing a polymer electrolyte according to the present invention. The method for manufacturing a copolymer can be designed, for example, for constituting a polymer electrolyte for a lithium or sodium battery cell, for instance for a solid-electrolyte lithium or sodium battery cell. For instance, the method for manufacturing a copolymer can be designed for constituting a polymer electrolyte for a lithium cell, for instance for a solid-electrolyte lithium cell, in particular battery cell.

In the example method, in particular, at least one lactone and/or at least one lactide and/or at least one cyclic carbonate and/or at least one cyclic carbamate and/or at least one lactam and/or at least one epoxide is polymerized by ring-opening polymerization, and/or at least one polymer polymerized by such ring-opening polymerization, i.e. at least one polymer polymerized by ring-opening polymerization of at least one lactone and/or of at least one lactide and/or of at least one cyclic carbonate and/or of at least one cyclic carbamate and/or of at least one lactam and/or of at least one epoxide, is used, and/or acrylonitrile and/or at least one acrylonitrile derivative is polymerized by radical polymerization, and/or at least one polymer polymerized by such radial polymerization, i.e. at least one polymer polymerized by radical polymerization of acrylonitrile and/or of at least one acrylonitrile derivative, is used; and/or at least one acrylate of the general chemical formula

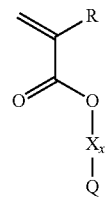

is polymerized by radical polymerization, and/or at least one polymer polymerized by such radical polymerization, i.e. at least one polymer polymerized by radical polymerization of at least one acrylate of the general chemical formula above, is used, and are linked to one another to constitute a copolymer encompassing at least two, if applicable at least three or four, lithium-ion-conductive polymers.

An "acrylate" can be understood in particular as an acrylic acid ester and/or an acrylic acid ester derivative. The term "acrylate" therefore also encompasses acrylic acid ester derivatives that can have, in particular instead of hydrogen, the substituent R.

R denotes, in particular, hydrogen or a halogen, in particular fluorine, or an alkyl group, for example a methyl group or ethyl group or propyl group or butyl group, or a nitrile group or an alkoxy group, for example an ethoxy group or methoxy group, or an oligo- or polyalkylene oxide group, in particular an oligo- or polyethylene oxide group, and/or a silyl group, for example a trimethylsilyl group or triethylsilyl group.

X denotes, in particular, a spacer, in particular a spacer bound, for example covalently, to the acrylate unit that forms the polymer backbone. x denotes the quantity, in particular the presence or absence, of the spacer X. x can be, in particular, 1 or 0. In the case in which x=1, in particular, a spacer X can be present. In the case in which x=0, in particular, no spacer can be present. The group Q can be attached, for example covalently, to the spacer X (in the case where x=1, presence of the spacer) or, in particular directly, for example covalently, to the acrylate unit that forms the polymer backbone (in the case in which x=0, absence of spacer).

Q denotes, in particular, a carbonate group, for example a cyclic carbonate group or an acyclic carbonate group, in particular a cyclic carbonate group, or a carboxylic acid ester group, for example a lactone group or an acyclic carboxylic acid ester group, in particular a lactone group, or an acetal group, for example a cyclic acetal group or an acyclic acetal group, or a carbamate group, for example a cyclic carbamate group or an acyclic carbamate group, in particular an acyclic carbamate group, or a lactam group or a nitrile group or an isonitrile group, and a cyanate group or an isocyanate group or a thiol group or a thiocyanate group or an isothiocyanate group or a thiocarbonyl group or a silyl group.

X can, for instance, encompass or be constituted from a, for example unhalogenated or halogenated, for instance unfluorinated or fluorinated, alkylene group, for example a methylene group and/or ethylene group and/or propylene group and/or butylene group, and/or a, for example unhalogenated or halogenated, for instance unfluorinated or fluorinated, alkyl group, for example a methyl group and/or ethyl group and/or propyl group and/or butyl group, and/or a carbonyl group, for instance a carbonate group and/or a carboxylate group and/or an anhydride group and/or an enone group and/or a carboxylic acid ester group and/or an amide group and/or an imide group and/or a ketone group and/or an aldehyde group and/or a, for example unhalogenated or halogenated, for instance unfluorinated or fluorinated, alkylene oxide group, for example an oligo- or polyalkylene oxide group, for instance an oligo- or polyethylene oxide group, and/or a, for example unhalogenated or halogenated, for instance unfluorinated or fluorinated, alkoxy group, for example an ethoxy group or methoxy group, and/or a, for example unhalogenated or halogenated, for instance unfluorinated or fluorinated, benzylene group and/or a, for example unhalogenated or halogenated, for instance unfluorinated or fluorinated, benzylene group and/or at least one nitrile group and/or at least one silyl group, for example at least one trimethylsilyl group and/or at least one triethylsilyl group. Suitable heteroatoms, for example oxygen in the case of a carboxylic acid ester group and/or nitrogen in the case of an amide group and/or imide group, can, if applicable, have at least one substituent, for instance one substituent in the case of the oxygen of a carboxylic acid ester group and the nitrogen of an imide group, and two substituents in the case of the nitrogen of an amide group, for instance in the form of an alkyl group having a chain length from $\geq 1$ to $\leq 15$ carbon atoms.

Ring-opening polymerization can advantageously be carried out in simple fashion and, in particular, can be controlled especially well. In addition, no byproducts, such as water, that need to be removed again after polymerization, are produced in the context of ring-opening polymerization, for example in contrast to polycondensation. It is thus advantageously possible to manufacture copolymers by ring-opening polymerization in simple fashion and with high product quality, for example with high homogeneity and/or with low polydispersity (PDI) and/or high purity.

Radical polymerization can also, advantageously, be carried out in simple fashion. Special radical polymerization processes, for example atom transfer radical polymerization (ATRP), can likewise be easily controlled. In addition, with radical polymerization as well, no byproducts such as water, which need to be removed again after polymerization, are produced. With radical polymerization as well, it is thus advantageously possible to manufacture copolymers in simple fashion and also with high product quality, for example with high purity and/or, in particular when atom transfer radical polymerization (ATRP) is used, also with high homogeneity and/or with low polydispersity (PDI).

In the context of a further embodiment, in the method at least one lactone and/or at least one lactide and/or at least one cyclic carbonate and/or at least one cyclic carbamate and/or at least one lactam and/or at least one epoxide is polymerized by ring-opening polymerization, and/or at least one polymer polymerized by such ring-opening polymerization, i.e. at least one polymer polymerized by ring-opening polymerization of at least one lactone and/or of at least one lactide and/or of at least one cyclic carbonate and/or of at least one cyclic carbamate and/or of at least one lactam and/or at least one epoxide, is used. In particular, in the method at least one lactone and/or at least one lactide and/or at least one cyclic carbonate and/or at least one cyclic carbamate and/or at least one lactam can be polymerized by ring-opening polymerization, and/or at least one polymer polymerized by such ring-opening polymerization, i.e. at least one polymer polymerized by ring-opening polymerization of at least one lactone and/or of at least one lactide and/or of at least one cyclic carbonate and/or of at least one cyclic carbamate and/or of at least one lactam, can be used.

As a result, the copolymer can be manufactured in simple fashion and, in particular, can exhibit easily adjustable properties.

In the context of an embodiment, in the method at least one lactone and/or at least one cyclic carbonate is polymerized by ring-opening polymerization, and/or at least one polymer polymerized by such ring-opening polymerization, i.e. at least one polymer polymerized by ring-opening polymerization of at least one lactone and/or at least one cyclic carbonate, is used.

For example, at least one lactone, in particular at least one caprolactone, for example ε-caprolactone, and/or at least one valerolactone, for example δ-valerolactone and/or at least one alkyl-δ-valerolactone, and/or at least one butyrolactone, for example β-butyrolactone and/or γ-butyrolactone, and/or at least one propiolactone, for example β-propiolactone, and/or at least one lactone having a ring size $\geq 8$ ring-forming atoms, for example at least one pentadecalactone, for example ω-pentadecalactone, for instance having a ring size of 16 ring-forming atoms, and/or at least one cyclic carbonate, in particular at least one dioxanone, for example at least one 1,3-dioxan-2-one, for example trimethylene carbonate and/or propylene carbonate and/or 2,2-dimethyltrimethylene carbonate, and/or at least one 1,4-dioxan-2-one, can encompass or be.

In particular, at least one lactone, in particular at least one caprolactone, for example ε-caprolactone, and/or at least one valerolactone, for example δ-valerolactone and/or at least one alkyl-δ-valerolactone, and/or at least one butyrolactone, for example β-butyrolactone and/or γ-butyrolactone, and/or at least one propiolactone, for example β-propiolactone, and/or at least one lactone having a ring size $\geq 8$ ring-forming atoms, for example at least one pentadecalactone, for example ω-pentadecalactone, for instance having a ring size of 16 ring-forming atoms, can be polymerized by ring-opening polymerization, and/or at least one polymer polymerized by such ring-opening polymerization can be used.

Ring-opening polymerization of lactones can be carried out in particular at an elevated temperature in the presence of a catalyst. For example, tin(II)-2-ethylhexanoate can be used as a catalyst for polymerizing caprolactones to polycaprolactones.

In the context of a further embodiment, more than 50%, in particular $\geq 55\%$ to $\leq 95\%$, for example $\geq 60\%$ to $\leq 90\%$, based on the sum of the number of monomers of all polymers of the copolymer, of the monomers of the copolymer are selected from the group of the lactones, lactides, cyclic carbonates, cyclic carbamates, lactams, and epoxides, for instance from the group of the lactones, lactides, cyclic carbonates, cyclic carbamates, and lactams, for example from the group of the lactones and cyclic carbonates, in particular from the group of the lactones.

In the context of a further embodiment, linkage to yield the copolymer is accomplished by atom transfer radical polymerization (ATRP). For instance, copper bromide (CuBr) can be used as a catalyst and/or, for example, dimethyl formamide (DMF) can be used as a solvent, in atom transfer radical polymerization (ATRP).

For example, the at least one polymer polymerized by ring-opening polymerization, and the at least one polymer polymerized by radical polymerization of the at least one acrylate, and/or the at least one polymer polymerized by radical polymerization of acrylonitrile and/or of at least one acrylonitrile derivative can be linked by atom transfer radical polymerization (ATRP) to yield the copolymer.

In the context of a preferred embodiment, however, the at least one acrylate and/or acrylonitrile and/or the at least one acrylonitrile derivative is polymerized by atom transfer radical polymerization (ATRP) onto the polymer polymerized by ring-opening polymerization. The molecular weight of the copolymer can thereby, advantageously, be particularly well controlled and/or adjusted.

Linkage to yield the copolymer, for example using atom transfer radical polymerization (ATRP), can be carried out in particular by way of a macroinitiator based on the at least one polymer polymerized by ring-opening polymerization, for example a polycaprolactone (PCL) macroinitiator.

The macroinitiator based on the at least one polymer polymerized by ring-opening polymerization can be manufactured, for example, by the fact that ring-opening polymerization is carried out in the presence of a macroinitiator forming agent, for example, in the case of polycaprolactone, in the presence of (MMPEP)Al(µ-OBnCH$_2$Cl)$_2$ (MMPEP=2,2-methylene-bis(4,6-di(1-methyl-1-phenylethyl) phenol) as a macroinitiator forming agent, which reacts to yield a P-(chloromethyl)benzene ester-end functionalized polycaprolactone as a macroinitiator (Macromolecules 2007, 40, 2814); or that the at least one polymer polymerized by ring-opening polymerization is reacted, in particular after ring-opening polymerization, with a macroinitiator forming agent, for example, in the case of polycaprolactone, with 2-bromoisobutyryl bromide as a macroinitiator forming agent to yield polycaprolactone-α-bromisobutyrate as a macroinitiator, or with acetic acid anhydride as a macroinitiator forming agent to yield polycaprolactone acetate as a macroinitiator. Linkage, for instance of a polycaprolactone and a polyacrylate, to yield the copolymer can be accomplished in particular via a functional group introduced by way of the macroinitiator forming agent, for example, in the case of 2-bromoisobutyryl bromide as a macroinitiator forming agent, via an isobutyrate group.

In atom transfer radical polymerization (ATRP), for example, a macroinitiator based on the at least one polymer polymerized by ring-opening polymerization, for example a polycaprolactone (PCL) macroinitiator, can be reacted with the at least one acrylate and/or acrylonitrile and/or with the at least one acrylonitrile derivative.

The at least one acrylate can encompass or be, for example, acrylamide and/or cyanoacrylate, in particular a cyanoalkyl acrylate, for example cyanoethyl acrylate (CEA) and/or cyanopropyl acrylate and/or cyanobutyl acrylate (CBA), and/or trimethylsilyl acrylate and/or 2-carboxyethyl acrylate and/or 2-[[(butylamino)carbonyl]oxy]ethyl acrylate and/or 4-acetoxyphenethyl acrylate and/or benzyl-2-propyl acrylate and/or cyanoalkyl acrylate.

In the context of a special embodiment, the at least one acrylate encompasses the general chemical formula

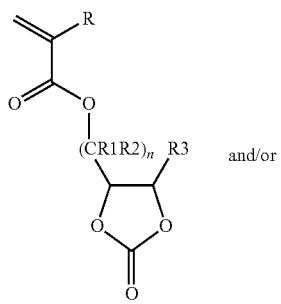

and/or

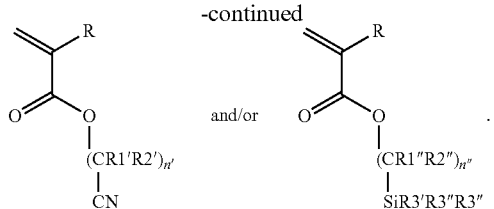

R can denote, for example, hydrogen or a halogen, in particular fluorine, or an alkyl group, for example a methyl group or ethyl group or propyl group or butyl group, or a nitrile group or an alkoxy group, for example an ethoxy group or methoxy group, or an oligo- or polyalkylene oxide group, in particular an oligo- or polyethylene oxide group, or a silyl group, for example a trimethylsilyl group or triethylsilyl group. For instance, R can denote hydrogen or an alkyl group, for example a methyl group, or a nitrile group or a silyl group. For example, R can denote hydrogen or an alkyl group, for example a methyl group.

R1, R2, and R3 and/or R1' and R2' and/or R1" and R2" can denote in particular, mutually independently in each case, hydrogen or a halogen, in particular fluorine, or an alkyl group, for example a methyl group or ethyl group or propyl group or butyl group, or a nitrile group or an alkoxy group, for example an ethoxy group or methoxy group, or an oligo- or polyalkylene oxide group, in particular an oligo- or polyethylene oxide group, or a silyl group, for example a trimethylsilyl group or triethylsilyl group, in particular hydrogen or a halogen, for example fluorine, for instance hydrogen.

n denotes in particular the number of CR1R2 units. It can be the case in particular that $0 \le n \le 10$, for example $0 \le n \le 8$, for instance $0 \le n \le 4$.

n' denotes in particular the number of CR1'R2' units. It can be the case in particular that $1 \le n' \le 10$, in particular $1 \le n' \le 8$, for example $1 \le n' \le 4$, for instance $2 \le n' \le 4$, for example n'=2, for instance in the case of cyanoethyl acrylate (CEA), or n'=4, for instance in the case of cyanobutyl acrylate (CBA).

n" denotes in particular the number of CR1"R2" units. It can be the case in particular that $0 \le n" \le 10$, in particular $0 \le n" \le 8$, for instance $1 \le n" \le 4$.

R3, R3", and R3'" can denote in particular, mutually independently in each case, an alkyl group, for example a methyl group or ethyl group or propyl group or butyl group. For instance, R3', R3", and R3'" can each denote a methyl group or an ethyl group.

The at least one acrylonitrile derivative can encompass, for example, the general chemical formula

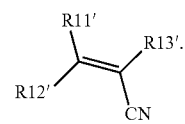

R11', R12', and R13' can denote in particular, mutually independently in each case, hydrogen or a halogen, in particular fluorine, or an alkyl group, for example a methyl group or ethyl group or propyl group or butyl group, or a nitrile group or an alkoxy group, for example an ethoxy group or methoxy group, or an oligo- or polyalkylene oxide group, in particular an oligo- or polyethylene oxide group, or a silyl group, for example a trimethylsilyl group or triethylsilyl group. For example, R11', R12', and R13' can denote, mutually independently in each case, hydrogen or a halogen, for instance fluorine.

In the context of a further embodiment of the method, the copolymer is mixed with at least one lithium or sodium conducting salt, in particular lithium conducting salt. A polymer electrolyte can thereby advantageously be constituted. For instance, the copolymer can be mixed with ≥10 wt % to ≤30 wt %, for example ≥15 wt % to ≤25 wt %, based on the total weight of the copolymer and of the at least one lithium or sodium conducting salt, in particular lithium conducting salt, in particular in total, of the at least one lithium or sodium conducting salt, in particular lithium conducting salt.

The polymer electrolyte can then be used for cell manufacture, for example to manufacture a cathode and/or a separator and/or a protective layer and/or an anode.

For example, the polymer electrolyte or a mixture encompassing the polymer electrolyte can be processed to form an, in particular self-supporting, film and/or an, in particular self-supporting, layer, and/or to form a coating, for instance for constituting the cathode and/or on the cathode and/or for constituting the anode and/or on the anode. Processing can be effected in this context both by way of a solvent-containing process, for instance wet-coating, and by way of a solvent-free process, for instance pressing and/or extrusion.

For instance, at least one additive, for example at least one crosslinking agent and/or at least one plasticizer and/or at least one high-voltage additive and/or at least one flame retardant and/or at least one solid electrolyte interface/interphase (SEI) forming agent and/or another polymer electrolyte additive, can furthermore be added to the copolymer.

A copolymer according to the present invention and/or one manufactured according to the present invention, and/or a polymer electrolyte according to the present invention and/or one manufactured according to the present invention, as well as a cell, cathode, anode, protective layer, and/or separator constituted therefrom, can be investigated, for example, by way of an inductively coupled plasma (ICP) and/or nuclear magnetic resonance (NMR) spectroscopy and/or by gel permeation chromatography (GPC) and/or by differential scanning calorimetry (DSC).

With regard to further technical features and advantages of the method according to the present invention, reference is herewith made explicitly to the explanations in conjunction with the copolymer according to the present invention, the polymer electrolyte according to the present invention, the cathode according to the present invention, the separator according to the present invention, the protective layer according to the present invention, the anode according to the present invention, and the cell according to the present invention, and to the exemplifying embodiments, the FIGURE, and the description of the FIGURE.

The present invention further relates to a cathode and/or a separator and/or a protective layer and/or an anode for a lithium or sodium cell, in particular for a solid-electrolyte lithium or sodium cell, in particular battery cell, for instance a lithium cell, encompassing a copolymer according to the present invention or one manufactured according to the present invention, and/or a polymer electrolyte according to the present invention or one manufactured according to the present invention. The polymer or the polymer electrolyte can advantageously also serve as a binder, for instance for constituting a composite electrode.

The cathode can encompass in particular at least one high-voltage cathode active material, for example having a cathode potential ≥4 V, for example ≥4.5 V, if applicable about approximately ≥5 V, with respect to lithium ($Li^+/Li$), for instance $LiMn_xFe_yPO_4$ (LMFP) and/or $LiCoPO_4$. For example, the cathode can be a composite cathode and/or an impregnated and/or infiltrated porous cathode.

With regard to further technical features and advantages of the cathode and/or protective layer and/or anode according to the present invention and/or the separator according to the present invention, reference is herewith made explicitly to the explanations in conjunction with the copolymer according to the present invention, the polymer electrolyte according to the present invention, the method according to the present invention, the cell according to the present invention, and to the exemplifying embodiments, the FIGURE, and the description of the FIGURE.

The present invention further relates to a lithium or sodium cell, in particular a solid-electrolyte lithium or sodium cell, in particular battery cell, for example a lithium cell, for instance a solid-electrolyte lithium cell, encompassing a copolymer according to the present invention or one manufactured according to the present invention and/or a polymer electrolyte according to the present invention or one manufactured according to the present invention and/or a cathode according to the present invention and/or a separator according to the present invention and/or a protective layer according to the present invention and/or an anode according to the present invention.

With regard to further technical features and advantages of the cell according to the present invention, reference is herewith made explicitly to the explanations in conjunction with the copolymer according to the present invention, the polymer electrolyte according to the present invention, the method according to the present invention, the cathode according to the present invention, the separator according to the present invention, the protective layer according to the present invention, and the anode according to the present invention, and to the exemplifying embodiments, the FIGURE, and the description of the FIGURE.

BRIEF DESCRIPTION OF THE DRAWING

Further advantages and advantageous embodiments of the subject matter of the present invention are illustrated by the exemplifying embodiments and the FIGURE, and are explained in the description that follows. It is to be noted in this context that the exemplifying embodiments and the FIGURE are merely descriptive in nature and are not intended to limit the present invention in any form.

FIG. 1 is a schematic graph to illustrate the ion conductivities of different exemplifying embodiments of polymer electrolytes according to the present invention.

DETAILED DESCRIPTION OF EXAMPLE EMBODIMENTS

Preliminary Experiments

Under comparable measurement conditions, homopolymers of ε-caprolactone (CL), (2-oxo-1,3-dioxolan-4-yl) acrylate (DOA), and (2-oxo-1,3-dioxolan-4-yl)butyl acrylate (DOBA) exhibited an electrochemical stability >4.5 V with respect to $Li^+/Li$, whereas polyethylene oxide (PEO) exhibited an electrochemical stability with respect to $Li^+/Li$ of only less than <4.4 V.

Exemplifying Embodiment Series 1: Poly(-caprolactone)-block-poly(2-oxo-1,3-dioxolan-4-yl)butyl acrylate block copolymers (PCL-block-POBA)

Firstly, in a separate synthesis run, poly(ε-caprolactone) (PCL) was manufactured by ring-opening polymerization of (ε-caprolactone) (CL), and a poly(ε-caprolactone) macroinitiator was generated therefrom by way of a macroinitiator forming agent. In a further synthesis step, the poly(ε-caprolactone) macroinitiator was radically reacted with (2-oxo-1,3-dioxolan-4-yl)butyl acrylate (DOBA), by atom transfer radical polymerization (ATRP) in dimethyl formamide (DMF) at elevated temperature with the aid of copper bromide (CuBr) as catalyst, to yield a poly(ε-caprolactone)-block-poly(2-oxo-1,3-dioxolan-4-yl)butyl acrylate block copolymer. Several poly(ε-caprolactone)-block-poly(2-oxo-1,3-dioxolan-4-yl)butyl acrylate block copolymers, having a respective monomer ratio (CL:DOBA) of ε-caprolactone (CL) to (2-oxo-1,3-dioxolan-4-yl)butyl acrylate of 30:70, 50:50, and 70:30, were manufactured in this fashion.

The poly(ε-caprolactone)-block-poly(2-oxo-1,3-dioxolan-4-yl)butyl acrylate (PCL-block-PDOBA) block copolymers thereby obtained were mixed with ≥10 wt % to ≤30 wt % lithium bis(trifluoromethanesulfonyl)imide (LiTFSI). Polymer electrolyte films were manufactured from the mixture using a solvent-based coating method.

Ion conductivity as a function of temperature was determined for some of the polymer electrolyte films. The results of those measurements are shown in FIG. 1.

The reference character 1a here characterizes the measurement results for a polymer electrolyte film made from a mixture of a poly(ε-caprolactone)-block-poly(2-oxo-1,3-dioxolan-4-yl)butyl acrylate (PCL-block-PDOBA) block copolymer having a monomer ratio (CL:DOBA) of 50:50 and 20 wt % lithium bis(trifluoromethanesulfonyl)imide (LiTFSI).

The reference character 1b characterizes the measurement results for a polymer electrolyte film made from a mixture of a poly(ε-caprolactone)-block-poly(2-oxo-1,3-dioxolan-4-yl)butyl acrylate (PCL-block-PDOBA) block copolymer having a monomer ratio (CL:DOBA) of 50:50 and 30 wt % lithium bis(trifluoromethanesulfonyl)imide (LiTFSI).

The reference character 2a characterizes the measurement results for a polymer electrolyte film made from a mixture of a poly(ε-caprolactone)-block-poly(2-oxo-1,3-dioxolan-4-yl)butyl acrylate (PCL-block-PDOBA) block copolymer having a monomer ratio (CL:DOBA) of 70:30 and 20 wt % lithium bis(trifluoromethanesulfonyl)imide (LiTFSI).

The reference character 2b characterizes the measurement results for a polymer electrolyte film made from a mixture of a poly(ε-caprolactone)-block-poly(2-oxo-1,3-dioxolan-4-yl)butyl acrylate (PCL-block-PDOBA) block copolymer having a monomer ratio (CL:DOBA) of 70:30 and 30 wt % lithium bis(trifluoromethanesulfonyl)imide (LiTFSI).

FIG. 1 shows that all the polymer electrolytes 1a, 1b, 2a, 2b that were investigated exhibit sufficient ion conductivity. In particular, all the polymer electrolytes 1a, 1b, 2a, 2b that were investigated exhibited an ion conductivity >$10^{-5}$ S/cm at 80° C.

FIG. 1 shows in particular that ion conductivity can be considerably increased by increasing the proportion of poly(ε-caprolactone) (PCL) and shifting the monomer ratio (CL:DOBA) from 50:50 (1a, 1b) to 70:30 (2a, 2b). The polymer electrolytes having a monomer ratio (CL:DOBA) of 70:30 in fact exhibited an ion conductivity of approximately $10^{-4}$ S/cm at 80°. Ion conductivity can thus advantageously be increased by increasing the stoichiometric ε-caprolactone proportion, in particular to more than 50%, in this example to 70%.

FIG. 1 furthermore shows that a high ion conductivity can be achieved with even a small conducting-salt proportion of 20 wt %.

Exemplifying Embodiment Series 2: Statistical poly(2-oxo-1,3-dioxolan-4-yl)acrylate-stat-polyacrylonitrile (PDOA-stat-PAN) copolymers In several synthesis runs separately from one another, different statistical poly(2-oxo-1,3-dioxolan-4-yl)acrylate-stat-polyacrylonitrile (PDOA-stat-PAN) copolymers were manufactured from (2-oxo-1,3-dioxolan-4-yl)acrylate (DOA) and acrylonitrile (AN), having respective monomer ratios (DOA:AN) of (2-oxo-1,3-dioxolan-4-yl)acrylate (DOA) to acrylonitrile (AN) of 20:80, 50:50, and 80:20, by radical polymerization in acetonitrile at approximately 70° C. using azobis(isobutyronitrile) as a radical starter. The copolymers had a molecular weight in a range from approximately 50 to 80 kDa, a PDI in a range from approximately 1.2 to 1.3, and a glass transition temperature in a range from approximately 60 to 80° C.

What is claimed is:

1. A copolymer for constituting a polymer electrolyte for a lithium or sodium cell, the copolymer comprising at least two ion-conductive polymers, the copolymer comprising:
    at least one polymer polymerized by ring-opening polymerization of at least one lactone and/or of at least one lactide and/or of at least one cyclic carbonate and/or of at least one cyclic carbamate and/or of at least one lactam;
    at least one polymer polymerized by radical polymerization of acrylonitrile and/or of at least one acrylonitrile derivative; and
    at least one polyacrylate having at least one repeating unit of the general chemical formula:

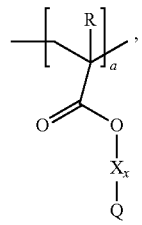

wherein a denotes a number of repeating units; R denotes hydrogen or a halogen or fluorine or an alkyl group or a nitrile group or an alkoxy group or an oligo- or polyalkylene oxide group or a silyl group; X denotes a spacer; x denotes a quantity of the spacer X and being 1 or 0; Q denotes a carbonate group or a carboxylic acid ester group or an acetal group or a carbamate group or a lactam group or a nitrile group or an isonitrile group or a cyanate group or an isocyanate group or a thiol group or a thiocyanate group or an isothiocyanate group or a thiocarbonyl group or a silyl group.

2. The copolymer as recited in claim 1, the copolymer having a molecular weight a range from ≥20 kD to ≤200 kD.

3. The copolymer as recited in claim 1, wherein the copolymer comprises at least one polymer polymerized by ring-opening polymerization of at least one lactone and/or of at least one lactide and/or of at least one cyclic carbonate and/or of at least one cyclic carbamate and/or of at least one lactam.

4. The copolymer as recited in claim 3, wherein the at least one polymer polymerized by ring-opening polymerization being polymerized by ring-opening polymerization of at least one lactone and/or of at least one cyclic carbonate.

5. The copolymer as recited in claim 1, wherein the at least one polymer polymerized by ring-opening polymerization comprises at least one repeating unit of the general chemical formula

wherein b denotes the number of repeating units; R11 and R12 denote, mutually independently in each case, hydrogen or a halogen, or an alkyl group or a nitrile group or an alkoxy group or an oligo- or polyalkylene oxide group or a silyl group; and m denotes a number of CR11R12 units, and wherein m is such that $1 \leq m \leq 14$.

6. The copolymer as recited in claim 1, wherein the at least one polymer polymerized by ring-opening polymerization being polymerized by ring-opening polymerization of at least one caprolactone.

7. The copolymer as recited in claim 1, wherein the at least one polymer polymerized by ring-opening polymerization has a highest number of monomers of the polymers of the copolymer, based on a sum of a number of monomers of all polymers of the copolymer, of the monomers in the at least one polymer polymerized by ring-opening polymerization.

8. The copolymer as recited in claim 1, wherein Q denotes a carbonate group, or a cyclic carbonate group, or an acyclic carbonate group, or a carboxylic acid ester group, or a lactone group, or an acyclic carboxylic acid ester group, or an acetal group, or a cyclic acetal group, or an acyclic acetal group, or a carbamate group, or a cyclic carbamate group, or an acyclic carbamate group, or a nitrile group and/or a silyl group.

9. The copolymer as recited in claim 1, wherein Q denotes a cyclic carbonate group or a cyclic acetal group or a lactone group or an acyclic carboxylic acid ester group or an acyclic carbamate group or a nitrile group or a silyl group.

10. The copolymer as recited in claim 1, wherein Q denotes a dioxolane group, or a (2-oxo-1,3-dioxolan-4-yl) alkyl group, or a (2-oxo-1,3-dioxolan-4-yl) group, or a (1,3-dioxolan-4-yl)alkyl group or (1,3-dioxolan-4-yl) group, or an acetoxy group or an [(alkylamino)carbonyl]oxy group or a nitrile group or a silyl group.

11. The copolymer as recited in claim 1, wherein the at least one polyacrylate has at least one repeating unit of the general chemical formula

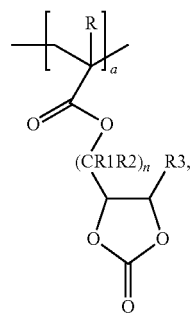

wherein a denotes a number of repeating units; R denotes hydrogen or a halogen or fluorine or an alkyl group or a nitrile group or an alkoxy group or an oligo- or polyalkylene oxide group or a silyl group; R1, R2, and R3 denote, mutually independently in each case, hydrogen or a halogen or fluorine, or an alkyl group or a nitrile group or an alkoxy group or an oligo- or polyalkylene oxide group or a silyl group; and n denotes a number of CR1R2 units, and wherein n is such that $0 \leq n \leq 10$.

12. The copolymer as recited in claim 1, wherein the at least one polyacrylate has at least one repeating unit of the general chemical formula

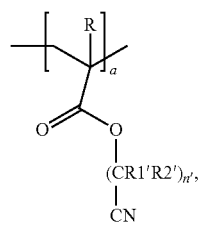

wherein a denotes a number of repeating units; R denotes hydrogen or a halogen or fluorine or an alkyl group or a nitrile group or an alkoxy group or an oligo- or polyalkylene oxide group or a silyl group; R1' and R2' denoting, mutually independently in each case, hydrogen or a halogen or fluorine or an alkyl group or a nitrile group or an alkoxy group or an oligo- or polyalkylene oxide group or a silyl group; n' denotes a number of CR1'R2' units, wherein n' is such that $1 \leq n' \leq 10$.

13. The copolymer as recited in claim 1, wherein the at least one polyacrylate has at least one repeating unit of the general chemical formula

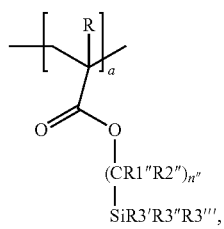

wherein a denotes a number of repeating units; R denotes hydrogen or a halogen or fluorine or an alkyl group or a nitrile group or an alkoxy group or an oligo- or polyalkylene oxide group or a silyl group; R1" and R2" denote, mutually independently in each case, hydrogen or a halogen or fluorine or an alkyl group or a nitrile group or an alkoxy group or an oligo- or polyalkylene oxide group or a silyl group; n" denotes a number of CR1"R2" units, and wherein n" is such that $0 \leq n" \leq 10$; and R3', R3", and R3'" denote, mutually independently in each case, an alkyl group.

14. The copolymer as recited in claim 1, wherein R denotes hydrogen or an alkyl group or a methyl group or a nitrile group or a silyl group or hydrogen.

15. The copolymer as recited in claim 1, wherein the at least one polymer polymerized by radical polymerization of acrylonitrile and/or of at least one acrylonitrile derivative comprises at least one repeating unit of the general chemical formula

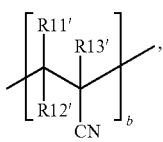

wherein b denotes a number of repeating units; R11', R12', and R13' denotes, mutually independently in each case, hydrogen or a halogen or fluorine or an alkyl group or a nitrile group or an alkoxy group or an oligo- or polyalkylene oxide group or a silyl group.

16. The copolymer as recited in claim 1, wherein the copolymer comprises the general chemical formula

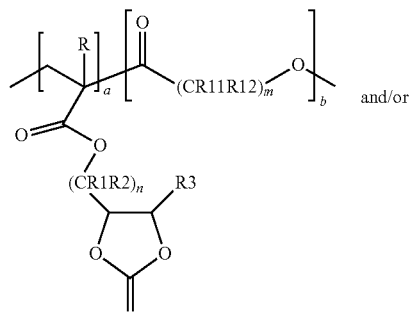

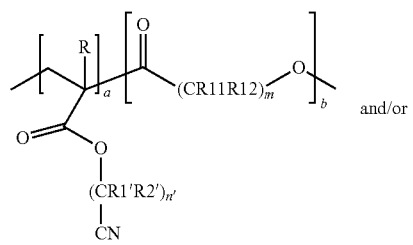

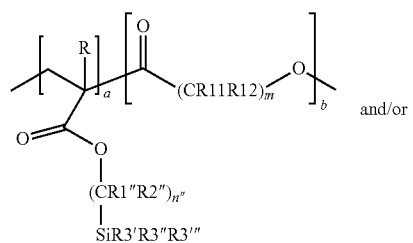

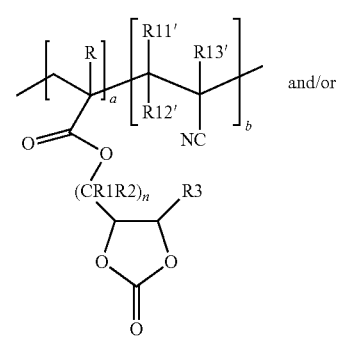

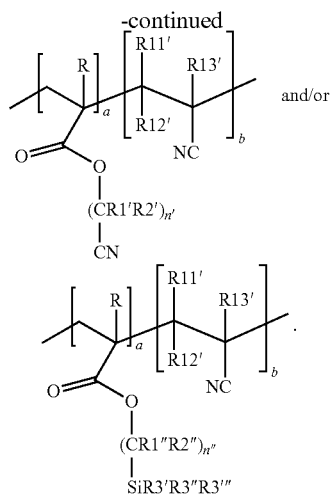

wherein b denotes the number of repeating units; R11 and R12 denote, mutually independently in each case, hydrogen or a halogen, or an alkyl group or a nitrile group or an alkoxy group or an oligo- or polyalkylene oxide group or a silyl group; and m denotes a number of CR11R12 units, wherein m is such that $1 \leq m \leq 14$, wherein R1, R2, and R3 denote, mutually independently in each case, hydrogen or a halogen or fluorine, or an alkyl group or a nitrile group or an alkoxy group or an oligo- or polyalkylene oxide group or a silyl group; and n denotes a number of CR1R2 units, wherein n is such that $0 \leq n \leq 10$, wherein R1' and R2' denoting, mutually independently in each case, hydrogen or a halogen or fluorine or an alkyl group or a nitrile group or an alkoxy group or an oligo- or polyalkylene oxide group or a silyl group; n' denotes a number of CR1'R2' units, wherein n' is such that $1 \leq n' \leq 10$, wherein R1" and R2" denote, mutually independently in each case, hydrogen or a halogen or fluorine or an alkyl group or a nitrile group or an alkoxy group or an oligo- or polyalkylene oxide group or a silyl group, wherein n" denotes a number of CR1"R2" units, and wherein n" is such that $0 \leq n" \leq 10$; and R3', R3", and R3'" denote, mutually independently in each case, an alkyl group, wherein R11', R12', and R13' denotes, mutually independently in each case, hydrogen or a halogen or fluorine or an alkyl group or a nitrile group or an alkoxy group or an oligo- or polyalkylene oxide group or a silyl group.

17. The copolymer as recited in claim 1, wherein the copolymer further comprises at least one further ion-conductive polymer, the at least one further ion-conductive polymer comprising at least one nitrile group and/or at least one isonitrile group and/or at least one cyanate group and/or at least one isocyanate group and/or at least one thiol group and/or at least one thiocyanate group and/or at least one isothiocyanate group and/or at least one acetal group and/or at least one carbonyl group and/or at least one carboxylic acid ester group, and/or at least one carbonate group and/or at least one carbamate group and/or at least one thiocarbonyl group and/or at least one ether group and/or at least one silyl group.

18. The copolymer as recited in claim 1, wherein the copolymer comprises the at least one polymer polymerized by ring-opening polymerization; the at least one polymer polymerized by radical polymerization of acrylonitrile; and the at least one polyacrylate.

19. The copolymer as recited in claim 1, wherein the at least one polymer polymerized by ring-opening polymerization being polymerized by ring-opening polymerization of at least one lactone, wherein R denotes an alkyl group, X denotes no spacer, x denotes a quantity of the spacer X being 0, and Q denotes a carbonate group.

* * * * *